Jan. 11, 1927.

G. F. PFEIFFER 1,614,152

LIME SPREADER

Filed May 13, 1926      3 Sheets-Sheet 1

Inventor

G. F. Pfeiffer

By Lacey & Lacey, Attorneys

Jan. 11, 1927.　　　G. F. PFEIFFER　　　1,614,152
LIME SPREADER
Filed May 13, 1926　　　3 Sheets-Sheet 2
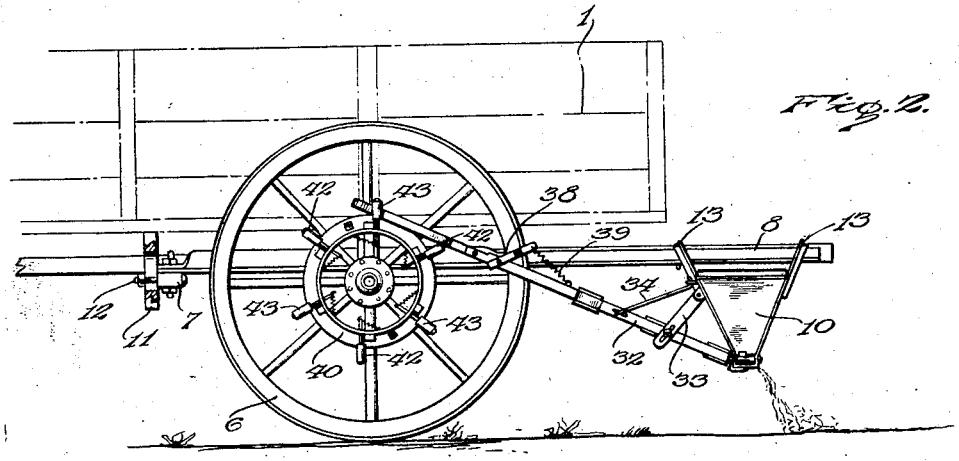
Fig. 2.
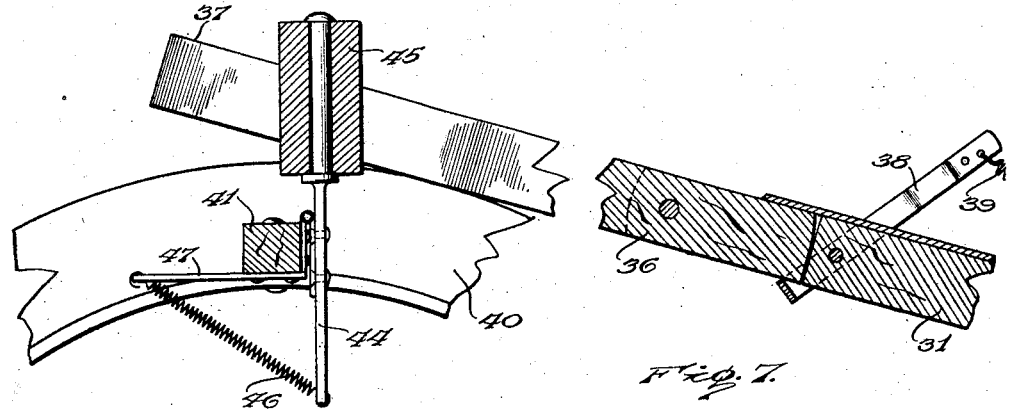
Fig. 3.
Fig. 7.
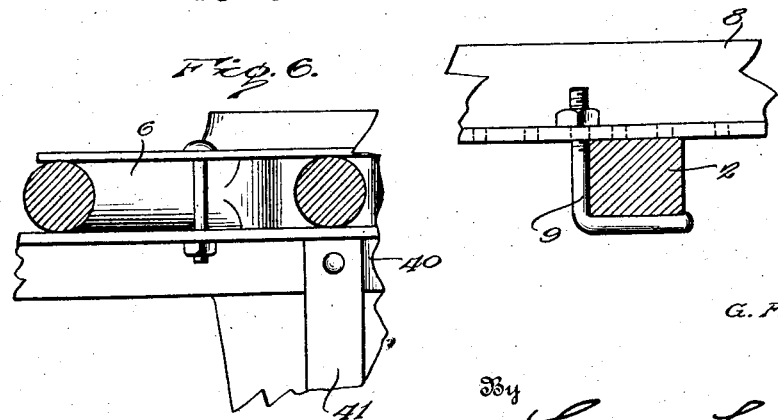
Fig. 6.
Inventor
G. F. Pfeiffer
By Lacey & Lacey, Attorneys Jan. 11, 1927.
G. F. PFEIFFER
LIME SPREADER
Filed May 13, 1926   3 Sheets-Sheet 3
1,614,152
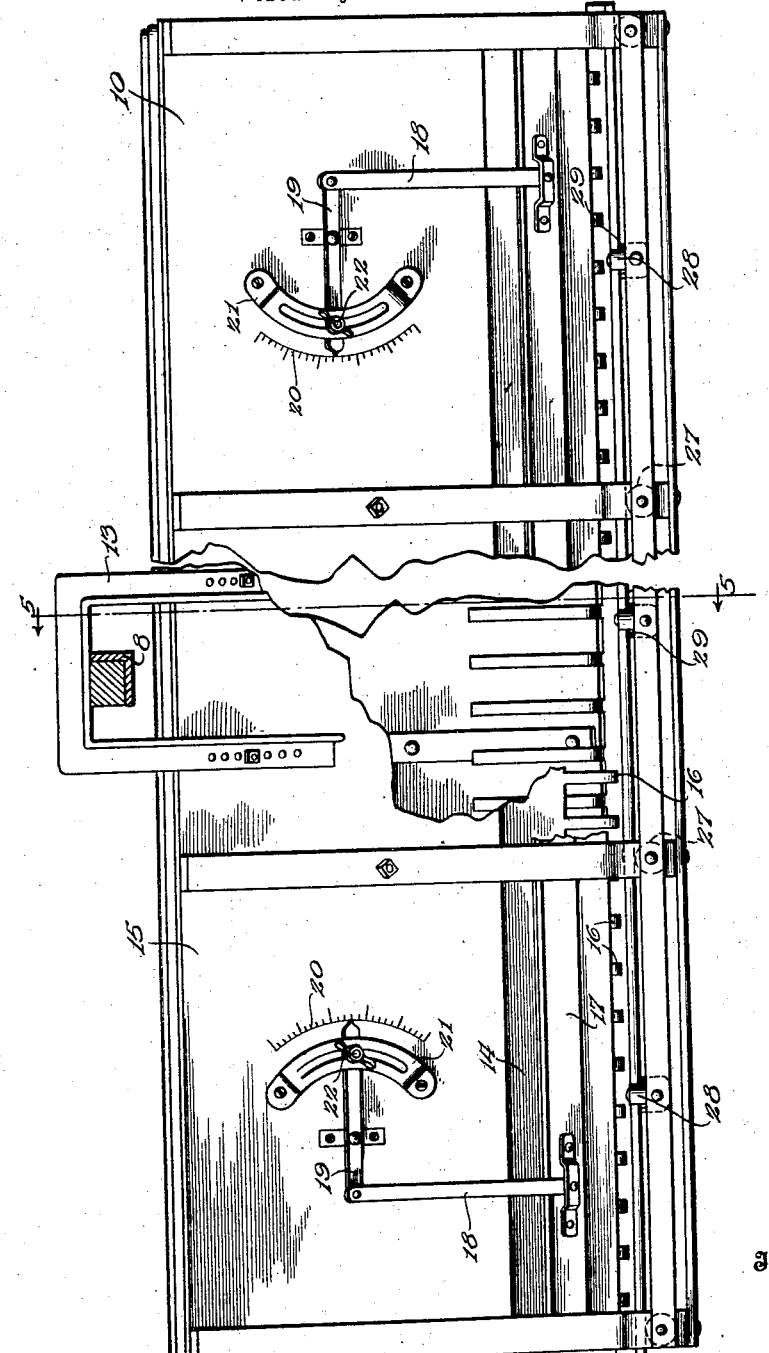
Inventor
G. F. Pfeiffer
By Lacey & Lacey, Attorneys Patented Jan. 11, 1927.

1,614,152

UNITED STATES PATENT OFFICE.

GOTTFRIED FRED PFEIFFER, OF SPOKANE, OHIO.

LIME SPREADER.

Application filed May 13, 1926. Serial No. 108,914.

The invention relates to a machine for distributing lime broadcast when preparing the soil for sowing seed. The machine may be used to advantage for spreading guano or other fertilizer as an agitating mechanism is included which prevents the material from clogging or banking in the hopper.

The invention contemplates a setting mechanism which may be adjusted to distribute a predetermined amount of fertilizer per acre and which is positive in action and not liable to injury when the machine is backed.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 2 is a side view,

Figure 3 is an enlarged fragmentary sectional view on the line 3—3 of Figure 1,

Figure 4 is an enlarged front view of the hopper, parts being broken away,

Figure 1:
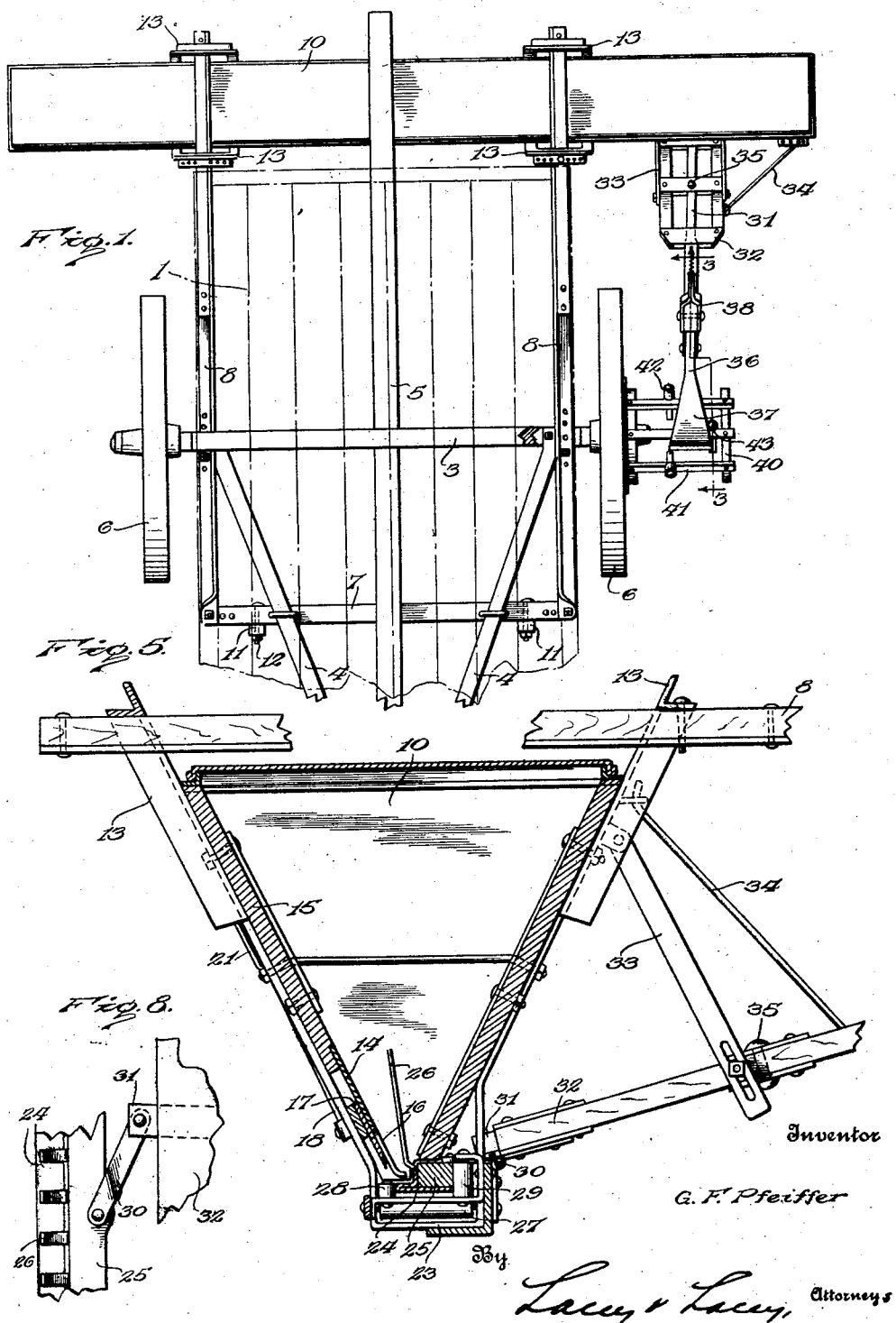
Figure 1 is a top plan view illustrative of an embodiment of the invention.

Figure 5 is a detail sectional view on the line 5—5 of Figure 4, parts being broken away, Figure 6 is a detail sectional view showing the manner of connecting the operating drum to the wheel of the vehicle to which the distributing mechanism is attached, Figure 7 is a detail view showing the manner of connecting the device to the axle of the vehicle, and Figure 8 is a detail view of a portion of the distributing mechanism.

Corresponding and like parts are referred to in the following description and designated in the several views of the drawings by like reference characters.

The vehicle body 1 may be of any construction and is mounted upon a running gear embodying an axle 2, bolster 3, hounds 4 and a reach or pole 5, the axle being equipped with supporting wheels 6.

The spreader mechanism embodies a supporting frame, a hopper and actuating mechanism. The supporting frame includes a cross bar 7 which is bolted or secured in any preferred way to the hounds 4 and longitudinal bars 8 which are connected at their front ends to the cross bar 7 and intermediate their ends to the axle 2 by fastenings 9 substantially as shown in Figure 7. The longitudinal bars 8 extend in the rear of the vehicle body 1 and support the hopper 10 which is suspended therefrom, so that the lower portion of the hopper approaches close to the surface of the ground to prevent the wind from scattering the lime or other fertilizer to be distributed. The longitudinal bars 8 are adapted to tilt to effect a vertical adjustment of the hopper, the front ends of the bars 8 being limited in their upward movement by stops 11 adjustably connected with the cross bars 7, as shown most clearly in Figure 2. Each of the stops 11 consists of a block in which is formed a vertical slot to receive a bolt 12 or like fastening, whereby the stop is secured to the cross bars 7 in the required adjusted position. The hopper 10 weights the rear ends of the longitudinal bars 8, thereby tending to move the same downwardly. This downward movement of the rear ends of the bars 8 is limited by the stops 11 which engage the bottom of the vehicle body 1.

The hopper 10 may be of any approved construction, capacity and length and its front and rear walls flare upwardly and are provided with hangers 13 which engage over the longitudinal bars 8 to which they are connected in any preferred way. A discharge opening is provided between the lower converging ends of the front and rear walls of the hopper and a plate 14 disposed along the lower end of the rear wall 15 of the hopper, has its lower edge cut away at intervals to provide fingers 16, the lower ends of which curve forwardly, as indicated most clearly in Figure 5. The spaces between the fingers 16 provide outlets for the escape of the lime or other material to be distributed. A plate 17 placed against the rear side of the plate 14 is adjustable vertically to regulate the discharge and links 18 connect opposite end portions of the plate 17 with one end of levers 19 pivoted intermediate their ends to the rear wall 15 of the hopper. The free ends of the levers 19 are pointed and cooperate with scale graduations 20 to indicate the amount of lime or other fertilizer to be distributed per acre.

Slotted plates 21, attached to the rear wall 15 of the hopper, receive fastenings 22 carried by the levers 19 and provide for securing said levers and the cut off plate 17 in the required adjusted position.

A support 23 is located below the hopper opposite the discharge and supports the combined feeder and agitator, whereby positive delivery of the lime or other fertilizer or material, is assured. A plate 24 is mounted upon the support 23 and is adapted to receive a reciprocatory movement, whereby to agitate and effect a delivery of the material. The plate 24 is reinforced by a bar 25 and fingers 26 project upwardly from the plate and operate to stir the material to cause a positive feed thereof, and prevent its banking in the hopper. The fingers 26 preferably form a part of the plate 24, the latter being folded upon itself intermediate its longitudinal edges and the upstanding portion being cut away at intervals to provide the fingers. The bar 25 is located in the angle formed between the upstanding and horizontal portions of the plate, thereby serving also to brace the fingers 26. Horizontal rollers 27 support the plate 24 from below. Vertical rollers 28 and 29 engage opposite edge portions of the plate 24 and prevent fore and aft movement thereof. The several rollers 27, 28 and 29 are mounted upon the support 23, the front rollers 29 being of a greater length than the rear rollers 28 and engaging both the reinforcing bar 25 and the plate 24. A link 30 connects the bar 25 with the lower rear end of a lever 31 which is pivoted intermediate its ends to a supporting frame 32 pivotally connected to the supporting frame 23 of the feeding and agitating mechanism. Braces 33 adjustably connect the frame 32 with the hopper and a laterally disposed brace 34 also serves to adjustably connect the frame 32 with an end portion of the hopper.

The lever 31 is pivoted to the frame 32 at 35 and an extension 36 is pivoted to the upper forward end of the lever 31 and terminates in a flared portion 37 which constitutes one member of the operating means. A loop 38 is pivoted to the upper end of the lever 31 and its lower end is adapted to underlap the lower rear end of the extension 36 so as to normally hold the extension in line with the lever 31. A spring 39 connects the upper end of the loop 38 with the lever 31 and normally holds said loop in operative position. When the loop 38 is moved to clear the lower end of the extension 36 the latter may be folded upon the lever 31 so as to be out of the way and inactive when it is not required to distribute any material, as when moving from one place to another.

A drum 40 is bolted or otherwise secured to the wheel 6 at the side of the vehicle upon which the lever 31 is located. This drum 40 is of skeleton formation and comprises circular ends and connecting strips 41. Tappets 42 and 43 are mounted upon every alternate strip 41 and as a result the tappets 42 are disposed opposite the spaces formed between the tappets 43 and the two sets of tappets 42 and 43 are spaced apart a distance less than the width of the flared portion 37 of the extension 36 of the lever 31. As a result of this arrangement the lever 31 is caused to oscillate as the drum 40 rotates. Each of the tappets consists of an arm 44 pivoted intermediate its ends to the supporting strip 41, the outer end of the arm 44 receiving a roller 45 and the inner end being connected by means of a spring 46 to an arm projected laterally from the strip 41 to which the arm 44 is pivoted. The side of the strip 41 constitutes a stop to hold the pivoted arm 44 in operative position, but should the drum 40 rotate in a reverse direction to cause the tappets to strike the ends of the extension 36, the arms 44 will turn about their pivot connection with the supporting strips 41 and thereby prevent injury to the parts. The springs 46 admit of the arms 44 yielding and return said arms to normal position after clearing the end of the extension 36 as will be readily understood.

The lime or other fertilizer, or material to be distributed, is supplied to the hopper 10 and as the vehicle is drawn over the field the drum 40 is rotated, thereby imparting an oscillatory movement to the lever 31 which in turn, causes the combined feeder and agitator to reciprocate with the result that a positive feed of the material is effected. Adjustment of the cut off 17 regulates the discharge as required, according to the predetermined scale 20 which coacts with the indicating lever 19.

Having thus described the invention, I claim:

1. The combination with a hopper having a discharge in its bottom and a lateral space in a side wall in communication with the discharge, of a plate attached to the side wall and projecting across the lateral space thereof and having its lower portion cut away at intervals to provide fingers, a second plate placed against the outer side of the first mentioned plate and operating means for adjusting the said second plate vertically to regulate the discharge of the material from the hopper.

2. The combination with a hopper having a discharge in its bottom, of a plate beneath the hopper folded upon itself longitudinally and having the upper folded portion bent vertically and cut away at intervals to provide teeth which extend upwardly into the hopper through the discharge thereof, and a reinforcing bar disposed in the angle formed between the lower folded portion of the plate and the vertical toothed portion thereof.

3. The combination with a hopper having a discharge in its bottom and a lateral space in a side wall in communication with the discharge, a plate beneath the hopper folded upon itself longitudinally, and having the upper folded portion bent vertically and cut away at intervals to provide teeth which extend upwardly into the hopper through the discharge thereof, and a plate attached to the side wall having the lateral space and toothed along its lower portion, the teeth overhanging the folded edge portion of the first mentioned plate and terminating opposite the upstanding toothed portion thereof.

4. A hopper having a discharge in its bottom, a support beneath the hopper, horizontal and vertical rollers mounted upon the support, a plate disposed upon the horizontal rollers and between the vertical rollers and folded longitudinally and having the upper folded portion bent vertically and toothed, a reinforcing bar in the angle formed between the lower folded portion of the plate and the upstanding toothed portion thereof, a toothed plate secured to a wall of the hopper and having its teeth overhanging the folded portion of the bottom plate, a cut-off plate placed against the said toothed plate and means for adjusting the cut off plate vertically to regulate the discharge.

In testimony whereof I affix my signature.

GOTTFRIED FRED PFEIFFER. [L. S.]